(12) United States Patent
Acker, Jr. et al.

(10) Patent No.: US 9,336,547 B2
(45) Date of Patent: May 10, 2016

(54) INTEGRATING LOCAL PRODUCTS INTO GLOBAL WEB SERVICES

(71) Applicant: WAL-MART STORES, INC., Bentonville, AR (US)

(72) Inventors: Joel Bennett Acker, Jr., Brush Prairie, WA (US); Douglas James Pedley, Portland, OR (US); Richard Neil Cancro, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 516 days.

(21) Appl. No.: 13/748,029

(22) Filed: Jan. 23, 2013

(65) Prior Publication Data

US 2014/0207591 A1 Jul. 24, 2014

(51) Int. Cl.
*G06G 1/12* (2006.01)
*G06Q 20/00* (2012.01)
*G06F 17/00* (2006.01)
*G06F 19/00* (2011.01)
*G06Q 30/06* (2012.01)
*G06Q 10/00* (2012.01)
*G06Q 20/20* (2012.01)
*G06Q 30/00* (2012.01)

(52) U.S. Cl.
CPC ............ *G06Q 30/0633* (2013.01); *G06Q 10/00* (2013.01); *G06Q 20/00* (2013.01); *G06Q 20/20* (2013.01); *G06Q 30/00* (2013.01)

(58) Field of Classification Search
CPC ... G06Q 10/00; G06Q 30/00; G06Q 30/0641; G06Q 20/00; G06Q 20/20; G06Q 30/3042; G06Q 30/06; G06K 7/10; G06K 15/00; G06F 17/30; G06F 19/322–19/327; G06F 17/3024; G06F 13/14

USPC .............. 705/26.1, 26.62, 4, 16, 21, 27.1, 18, 705/7.13, 26.8, 3, 22; 235/375–383; 380/277, 279, 30

See application file for complete search history.

(56) References Cited

U.S. PATENT DOCUMENTS

| | | | | |
|---|---|---|---|---|
| 6,912,507 B1 * | 6/2005 | Phillips | ............ | G06Q 10/06311 705/22 |
| 6,954,735 B1 * | 10/2005 | Djupsjobacka | ........ | G06Q 30/06 701/533 |
| 6,974,078 B1 * | 12/2005 | Simon | ..................... | G06Q 30/06 235/375 |
| 7,063,263 B2 * | 6/2006 | Swartz | ................... | G06K 17/00 235/462.45 |
| 7,069,227 B1 * | 6/2006 | Lintel, III | ............. | G06F 19/328 705/2 |
| 7,334,728 B2 * | 2/2008 | Williams | ................ | G06Q 10/00 235/381 |
| 7,347,373 B2 * | 3/2008 | Singh | ....................... | G06K 7/14 235/462.01 |
| 7,505,923 B1 * | 3/2009 | Yoshioka | ............... | G06Q 30/00 705/26.1 |

(Continued)

*Primary Examiner* — Olusegun Goyea
(74) *Attorney, Agent, or Firm* — Howard & Howard Attorneys PLLC

(57) ABSTRACT

Systems and methods are disclosed herein for integrating locally carried products into web services provided by a global server. A user computing device, such as a mobile phone, is used to scan optical codes for products. A product identifier extracted from the optical code is used to request product information from a global server system with respect to the product or to take an action with respect to the product, such as adding the product to an electronic shopping cart. For locally carried products, notice may be provided to the user computing device to scan the product using an in-store scanner. Upon scanning the optical code, the in-store scanner retrieves product information from a local server system and encodes this information in an optical code, which the user computing device scans in order to use with respect to a web service or web-integrated transaction.

18 Claims, 6 Drawing Sheets

(56) References Cited

U.S. PATENT DOCUMENTS

| | | |
|---|---|---|
| 7,725,326 B1 | 5/2010 | Tracy |
| 7,856,368 B2 | 12/2010 | Avallone |
| 8,005,720 B2 | 8/2011 | King |
| 8,019,648 B2 | 9/2011 | King |
| 8,150,739 B1* | 4/2012 | Marggraff .......... G06Q 30/0601 705/26.1 |
| 8,238,888 B2* | 8/2012 | Ramer .................. G06Q 30/02 455/414.1 |
| 8,239,276 B2* | 8/2012 | Lin ....................... G06Q 30/02 705/26.1 |
| 2002/0002504 A1 | 1/2002 | Engel |
| 2002/0077930 A1* | 6/2002 | Trubey .................. G06Q 30/02 705/27.2 |
| 2002/0082945 A1* | 6/2002 | Tenorio ............ G06F 17/30321 705/26.1 |
| 2002/0111870 A1* | 8/2002 | Chinnappan ...... G06F 17/30873 705/26.62 |
| 2003/0088442 A1* | 5/2003 | Michael ................ G06F 19/327 705/3 |
| 2005/0040230 A1* | 2/2005 | Swartz ................... G06K 17/00 235/383 |
| 2005/0091128 A1* | 4/2005 | Luo ...................... G06Q 10/087 705/28 |
| 2005/0187971 A1* | 8/2005 | Hassan ............ G06F 17/30424 |
| 2006/0287925 A1* | 12/2006 | Taylor .................. G06Q 30/02 705/26.61 |
| 2007/0011022 A1* | 1/2007 | Wright ................. G06Q 10/087 705/26.1 |
| 2007/0108269 A1* | 5/2007 | Benco ................... G06Q 20/12 235/380 |
| 2007/0266030 A1* | 11/2007 | Bradley ............ G06F 17/30362 |
| 2008/0031459 A1* | 2/2008 | Voltz ...................... H04L 9/083 380/279 |
| 2008/0133791 A1* | 6/2008 | Hodges .................. H04W 8/22 710/33 |
| 2008/0210754 A1* | 9/2008 | Lovett ................... G06Q 20/24 235/380 |
| 2008/0270249 A1* | 10/2008 | Rosenbaum ........... G06Q 30/02 705/26.1 |
| 2009/0050698 A1* | 2/2009 | Storey ................... G06Q 30/06 235/383 |
| 2009/0106042 A1* | 4/2009 | Maytal ................. G06Q 30/018 705/317 |
| 2010/0082447 A1* | 4/2010 | Lin ..................... G06Q 30/0601 705/26.1 |
| 2011/0302214 A1* | 12/2011 | Frye ................. G06F 17/30247 707/802 |
| 2012/0089467 A1* | 4/2012 | Comparelli ........ G06Q 30/0241 705/16 |
| 2012/0089471 A1* | 4/2012 | Comparelli ............ G06Q 20/20 705/18 |
| 2013/0013390 A1* | 1/2013 | Paulson-Ellis ..... G06Q 30/0268 705/14.38 |
| 2013/0110678 A1* | 5/2013 | Vigier ................... G06Q 30/06 705/26.61 |
| 2013/0339165 A1* | 12/2013 | Calman ................. G06Q 30/06 705/16 |

* cited by examiner

INTEGRATING LOCAL PRODUCTS INTO GLOBAL WEB SERVICES

BACKGROUND

1. Field of the Invention

This invention relates to systems and methods for maintaining a stock of products on shelves in a retail environment.

2. Background of the Invention

A large store chain may make merchandising decisions for a large number of stores at a global level. However, local or regional management may also have some autonomy to carry products. For instance, products that suit local tastes or that are produced locally may be carried by an individual store or stores in a particular geographic region. It may not be feasible for these locally carried products to be reported to global management or global server systems. These products present an obstacle to a large retailer that wishes to integrate web services with a customer's retail experience inasmuch as data for these locally carried products is not available in global databases. Likewise, it is not feasible for each local store to maintain the expert staff needed to integrate these products into web services.

The systems and methods described herein provide an improved approach for integrating locally carried products into web services provided to retail customers.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
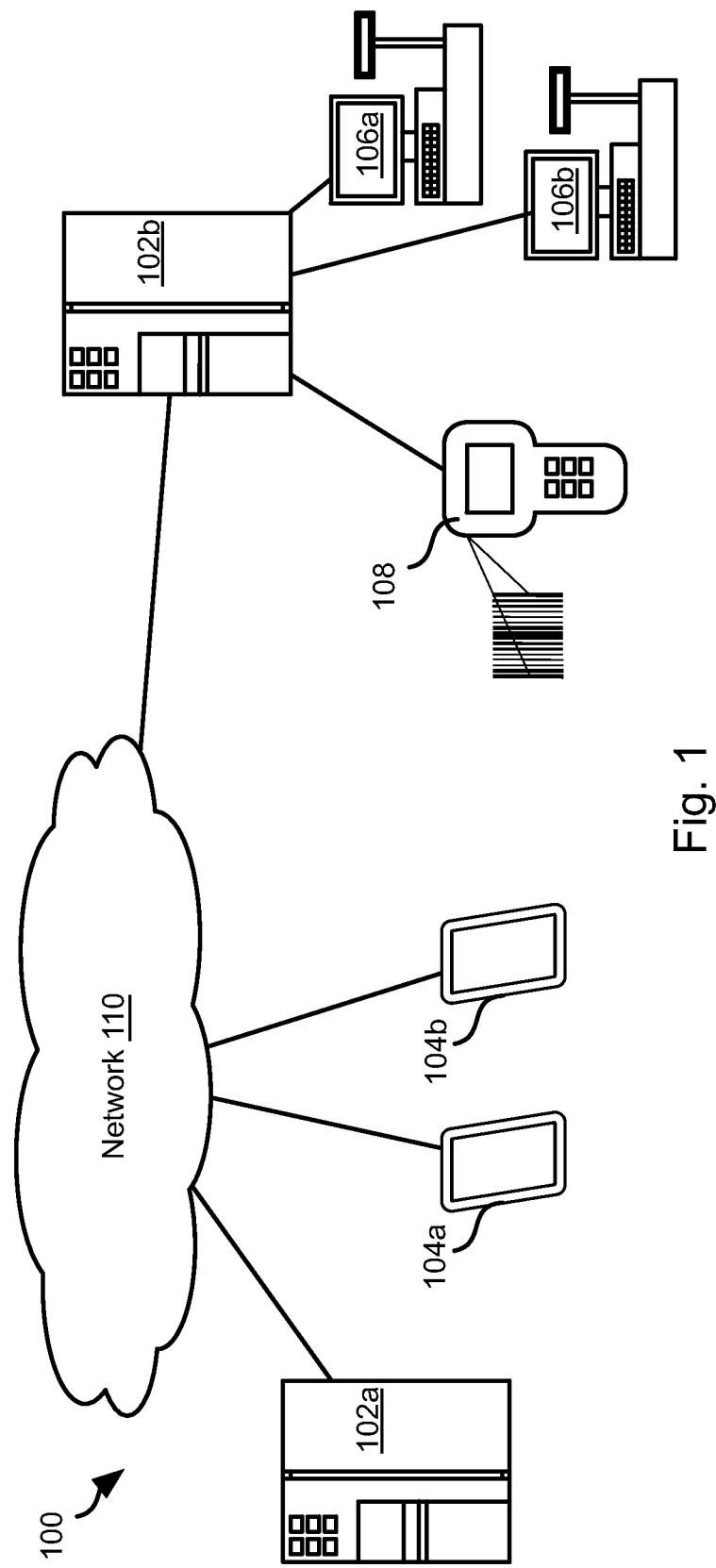
FIG. 1 is a schematic block diagram of a system suitable for performing methods in accordance with embodiments of the invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The embodiments disclosed herein may advantageously be implemented using a Java language and runtime environment or a Node.js implementation. In particular, functionality implemented on a server may be implementing using one or both of these methods.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include a server system 102a that may be embodied as one or more server computers each including one or more processors that are in data communication with one another. The server system 102a may be in data communication with one or more customer computers 104a, 104b and one or more point of sale (POS) devices 106a, 106b. In the methods disclosed herein, the customer computers 104a, 104b are advantageously mobile devices such as a mobile phone or tablet computer. As known in the art, many mobile phones and tablet computers also include cameras that can be used to scan optical codes such as barcodes, two-dimensional bar codes (e.g. quick response (QR) codes), or textual information. In some embodiments, some or all of the methods disclosed herein may be performed using a desktop computer or any other computing device as the customer computer 104a, 104b. For purposes of this disclosure, discussion of communication with a user or entity or activity performed by the user or entity may be interpreted as communication with a computer 104a, 104b associated with the user or entity or activity taking place on a computer associated with the user or entity. A POS 106a-106b may be located within a store and may be part of a POS network. In some embodiments, a POS 106a, 106b may be operable to process online transactions. In some embodiments, separate computers of the server system 102 may handle communication with the customer computers 104a, 104b and POS 106a, 106b.

In some embodiments, a server system 102a is a global server system 102a owned or controlled by a merchant operating multiple stores, such as over a large geographic area. Individual stores may have their own local server systems 102b that store or access data that is unique to a particular store or to stores in a particular region. In such embodiments, the local server system 102b may likewise be in data communication with the POS 106a, 106b associated with the server system 102b, such as the POS 16a, 106b of a store or stores in a region. In some embodiments, the server system 102b may be in data communication with a scanner 108 that is located in the store and available for use by customers.

The server system 102b may communicate with the POS 106a, 106b and scanner 108 by means of a local network, such as a local wireless or wired network. The server system 102a may likewise communicate with the server 102b such as by means of a network 110. The network 110 may be embodied as a peer-to-peer wireless connection between devices, a connection through a local area network (LAN), WiFi network, the Internet, or any other communication medium or system. The user computing device 104a, 104b may likewise communicate with the server system 102a by means of the network 110. In some embodiments, the user computing devices 104a, 104b communicate with one or both of the POS 106a, 106b and server 102b by way of the server system 102a in order to implement the methods disclosed herein. In other embodiments, the user computing devices 104a, 104b communicate directly with these devices by means of a network such as a network local to a store or the network 110.

Figure 2:
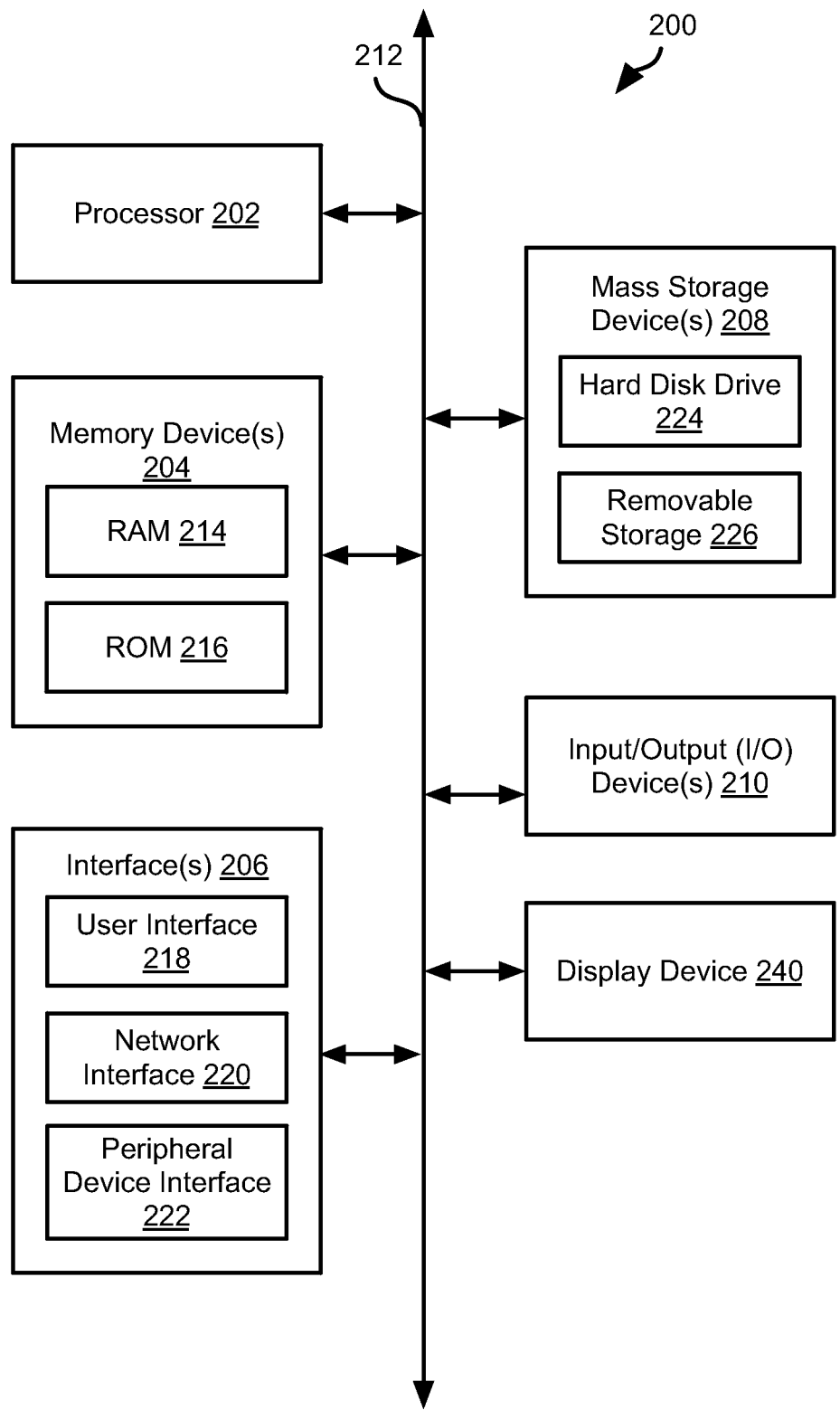
FIG. 2 is a block diagram of a computing device suitable for implementing embodiments of the invention.

FIG. 2 is a block diagram illustrating an example computing device 200. Computing device 200 may be used to perform various procedures, such as those discussed herein. A server system 102a, 102b, customer device 104a, 104b, POS 106a, 106b, and scanner 108 may include some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
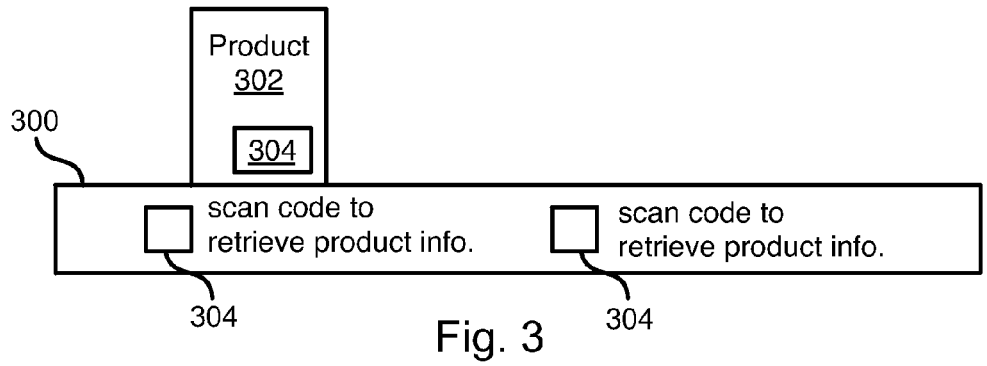
FIG. 3 is a schematic diagram of a shelf using which the methods in accordance with the invention may be implemented.

FIG. 3 illustrates a shelf 300 suitable for use in accordance with the methods described herein. The shelf 300 may bear one or more products 302 as well as one or more optical codes 304. Each optical code 304 may correspond to a product 302 located on the shelf at the position of the optical code 304 or otherwise adjacent the optical code 304. The shelf 300 may be located anywhere in a store including within a display case, refrigerated display, or any other location. In some embodiments, the shelf 300 may be embodied as a hook or other structure supporting a product when in stock and having an optical code 304 secured thereto or positioned adjacent thereto. In some embodiments, a product in stock may rest on a pedestal or the floor. In such embodiments, the optical code 304 corresponding to the product may be secured to the pedestal or floor or may be mounted on a sign or other structure positioned adjacent the in-stock location for the product. The optical code 304 may additionally or alternatively be affixed to the product 302 itself or the packaging of the product 302.

The optical 304 may be a bar code, two-dimensional bar code (e.g., quick response (QR) code), or any other optical code. The optical code 304 may encode a product identifier of the product corresponding to the optical code. In some embodiments, the optical code 304 may encode an "address" that uniquely identifies the shelf and position on a shelf, or other location in a store. The address may additionally include an address or other identifier of the store. A database may include mappings of an address to a product currently stocked at that address. Accordingly, the address of the optical code 304 in combination with the mapping may be used to obtain an identifier of the product currently corresponding to the optical code 304. In this manner, a store is not required to mount new optical codes 304 each time the stocking location of products is changed—only the mapping in the database need change. The optical code 304 may encode other information corresponding to an associated product that may be used for purposes other than the embodiments disclosed herein, such as a uniform resource locator (URL) for a web site providing information such as product reviews, product description, or other information.

In some embodiments, the optical code 304 may have one or more instructions displayed adjacent thereto, such as instruction that says "scan code to obtain product information," "scan code to add to electronic shopping cart," "scan code to report this item out of stock," "scan code to report this item out of stock or retrieve product information," or some other message. In some embodiments, the optical code 304 or any instructions may be displayed on an electronic screen that is independently addressable to change the information displayed thereon. In such embodiments, a mapping between an address of the electronic screen and a product may be used to select information to display on the electronic screen, e.g. the optical code 304 corresponding to the product corresponding to the address of the electronic screen.

Figure 4:
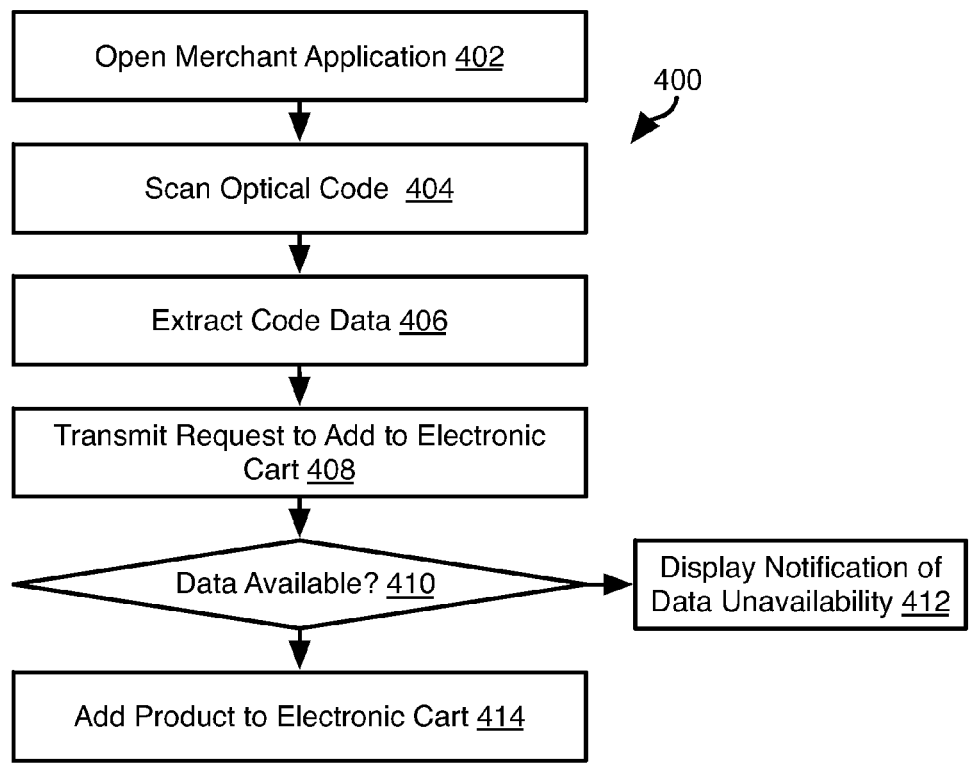
FIG. 4 is a process flow diagram for adding in-store items to an electronic shopping cart in accordance with an embodiment of the invention.

FIG. 4 illustrates a method 400 that may be executed by a customer computing device 104a, 104b or executed elsewhere with an interface provided on the customer computing device 104a, 104b. The method 400 may include opening a merchant application 402 and scanning 404 the optical code corresponding to a product. In some embodiment, the optical code for a product may encode a uniform resource locator (URL), such that scanning 404 of the code invokes a browser or other application in which the remaining steps of the method 400 may be executed. Alternatively, scanning 404 of the optical code within the operating context of a merchant application may invoke the remaining steps of the method 400. In some embodiments, a customer may type in a product identifier to a an interface, such as a merchant application, rather than scanning an optical code in order to select a product for processing in accordance with the methods described herein.

Data encoded in the scanned code may be extracted 406. The extracted data may include one or more of a product identifier, a URL that is associated with a product identifier, data relating to a product associated with the product identifier, or other data. A request to add the product to an electronic cart may be transmitted 408, such as by transmitting the request to a server system 102b. The data structure representing the electronic shopping cart may be stored by the server system 102a or in a database accessible by the server system 102a. Alternatively, the electronic shopping cart may be stored on the user computing device 104a that invoked the method 400. In such embodiments, the request to add the product to the electronic shopping cart may include requesting and receiving information relating to the product for adding the product to the cart. This information may include such information as a price or other information relevant to a consumer, such as reviews, product description, or other information.

In some instances, a product and its corresponding bar code or other optical code may not be known to a server 102a. For example, a store may store locally produced products or products that are regionally or locally popular. A store may also try out new products that have not yet been accepted for sale at all stores of a merchant. For such products, a response to a request for information or to add a product to an electronic shopping cart may include notice that the product was not found or is otherwise not known to the server system 102a. In this case, if the response is found 410 to indicate that data for a product is not available, notification may be displayed or transmitted for display on the user computing device 104a. The notification may include an instruction or prompt to take actions described in greater detail below with respect to products unknown to a server system 102a. In particular, the displayed 412 notification may include an instruction or prompt to scan the product using an in-store scanner 108. The notification may further include one or more of a map indicating a location of the scanner, turn-by-turn directions to arrive at the scanner, or other information to help the user to obtain product information using an in-store scanner 108, add the product to an electronic shopping cart as is described in greater detail below, or take other action with respect to the product.

If product information is found 410 to be available on the server, the product may be added 414 to the electronic shopping cart associated with the user invoking the method 400 on a user computing device 104a. In some embodiments or applications, adding 414 the product to an electronic shopping cart may be replaced or supplemented with some other action, such as invoking a web service provided by the global server system 102a. As noted above, the product may be added to the electronic shopping cart at the server system 102a or to a locally stored electronic shopping cart on a device 104a, 104b using information received from the server system 102a.

Figure 5:
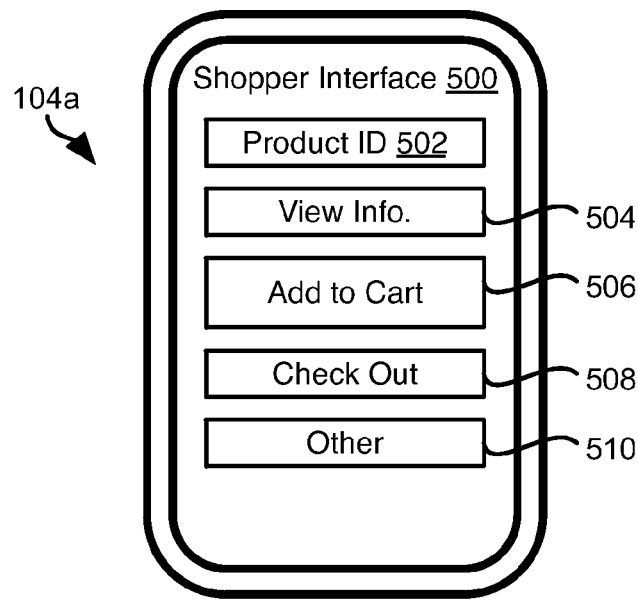
FIG. 5 is a schematic block diagram of an interface of a mobile device in accordance with an embodiment of the invention.

FIG. 5 illustrates an interface 500 that may be displayed on a customer computing device 104a during performance of the methods disclosed herein. The illustrated interface may be displayed by an application installed on the customer computing device 104a The illustrated interfaces may be displayed in a web page rendered on the customer computing device 104a, where the web page is retrieved in response to scanning an optical code 304 corresponding to the product or otherwise invoked by the customer with respect to a product.

The shopper interface 500 may include a product identifier 502 identifying the product corresponding to the scanned optical code 304 or otherwise input by the customer. The product identifier 502 may include text or images corresponding to the product. The interface 500 may include interface elements for invoking one or more actions with respect to the product. For example, some or all of the listed interface elements 504-510 may be included in a shopping interface 500.

For example, an interface element 504 may invoke display of product information, reviews of the product, or other information relating to a product. An interface element 506 may invoke addition of the product to an electronic shopping cart of the customer that is maintained on the customer device 104a or in a customer account maintained or accessed by the global server system 102a. For example, interface element 506 may invoke execution, or be selected as part of execution, of the method 400.

An interface element 508 may invoke check out for the electronic shopping cart according to methods described hereinbelow. One or more other user interface elements 512 may invoke other actions with respect to the product or any other action of use to the user.

Figure 6:
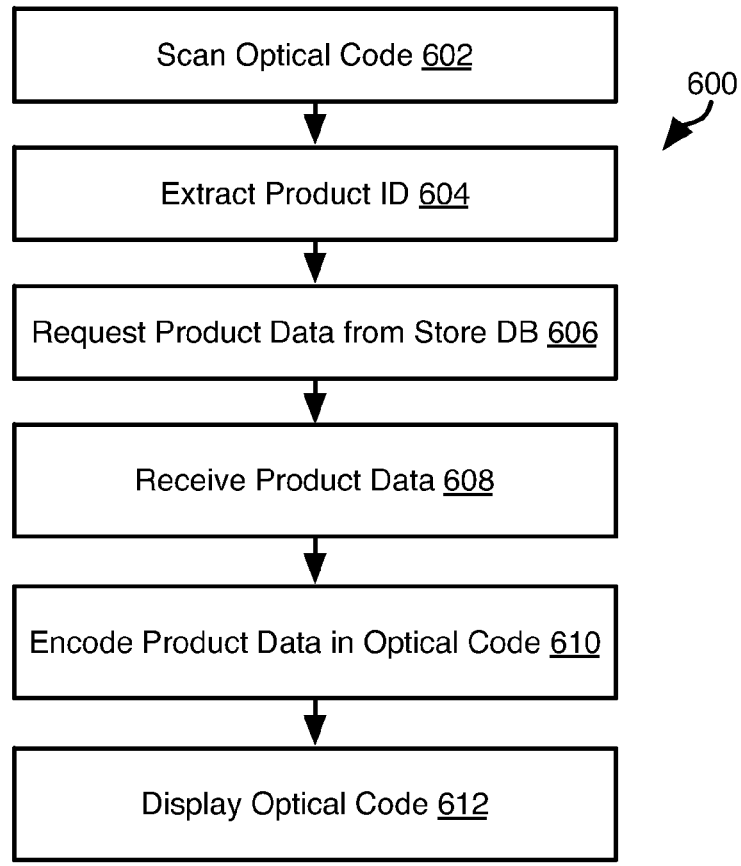
FIG. 6 is a process flow diagram of a method for providing product information using an in-store scanner in accordance with an embodiment of the invention.

FIG. 6 illustrates a method 600 that may be executed by an in-store scanner 108. The in-store scanner 108 may be a laser bar code scanner, a camera, or other device capable of detecting an optical code such as a bar code or two-dimensional bar code (e.g., QR code). The in-store scanner 108 may be affixed to a shelf or free standing platform or other structure to prevent removal. The in-store scanner 108 may also be a portable device that is used on a customer's behalf by a store employee or loaned to the customer.

The method 600 may include scanning 602 an optical code, such as an optical code 304 affixed to a product or the shelf or display where a product is stocked. The step of scanning 602 may be performed by a customer that was unable to add the product to an electronic cart by way of the server system 102a when scanning the optical code using the user's mobile computing device.

The method 600 may include extracting 604 a product identifier from the scanned optical code. The product identifier may be an actual product identifier, such as a uniform product code (UPC) or may be a data value that can be used to retrieve an actual product identifier. The product identifier may be local in scope to a store or regional group of stores having common merchandising, such as local to a database stored or accessed by a server system 102b for the store or regional group of stores. The product identifier or other data extracted 604 may then be used to request 606 product data. The request 606 may be addressed to the local server system 102b. Alternatively or additionally the requests 606 may be addressed to a global server system 102a first, and then a requests may be transmitted to the local server system 102b if the global server system 102a indicates a lack of information for the product identifier in the request. In some embodiments, the local server system 102b is synchronized with the global server system 102a such that a request need only be addressed to the local server system 102a to obtain product information whether globally known or only locally known.

The in-store scanner receives 608 product data from the local server system 102b or global server system 102a and encodes 610 the product information in an optical code. Two-dimensional bar codes, such as quick response (QR) codes can store a large amount of information in addition to a simple product identifier. For example, the QR code may encode a data object such as a JSON (JavaScript Object Notation) string. Accordingly, the received data may likewise include more than a product identifier and this additional information may be encoded 610. The additional information may include any information that may be of interest to a consumer or helpful in concluding a transaction, such as price, a product image, a product description, one or more product reviews by consumers or experts, or any other product information. In some embodiments, the encoded data may include a data object or a formatted list of data values that would have been returned by a server system 102a for a product for use in a merchant application. The encoded 610 data may then be displayed 612 on the in-store scanner 108 for detection by a consumer and use in accordance with the methods described herein.

Figure 7:
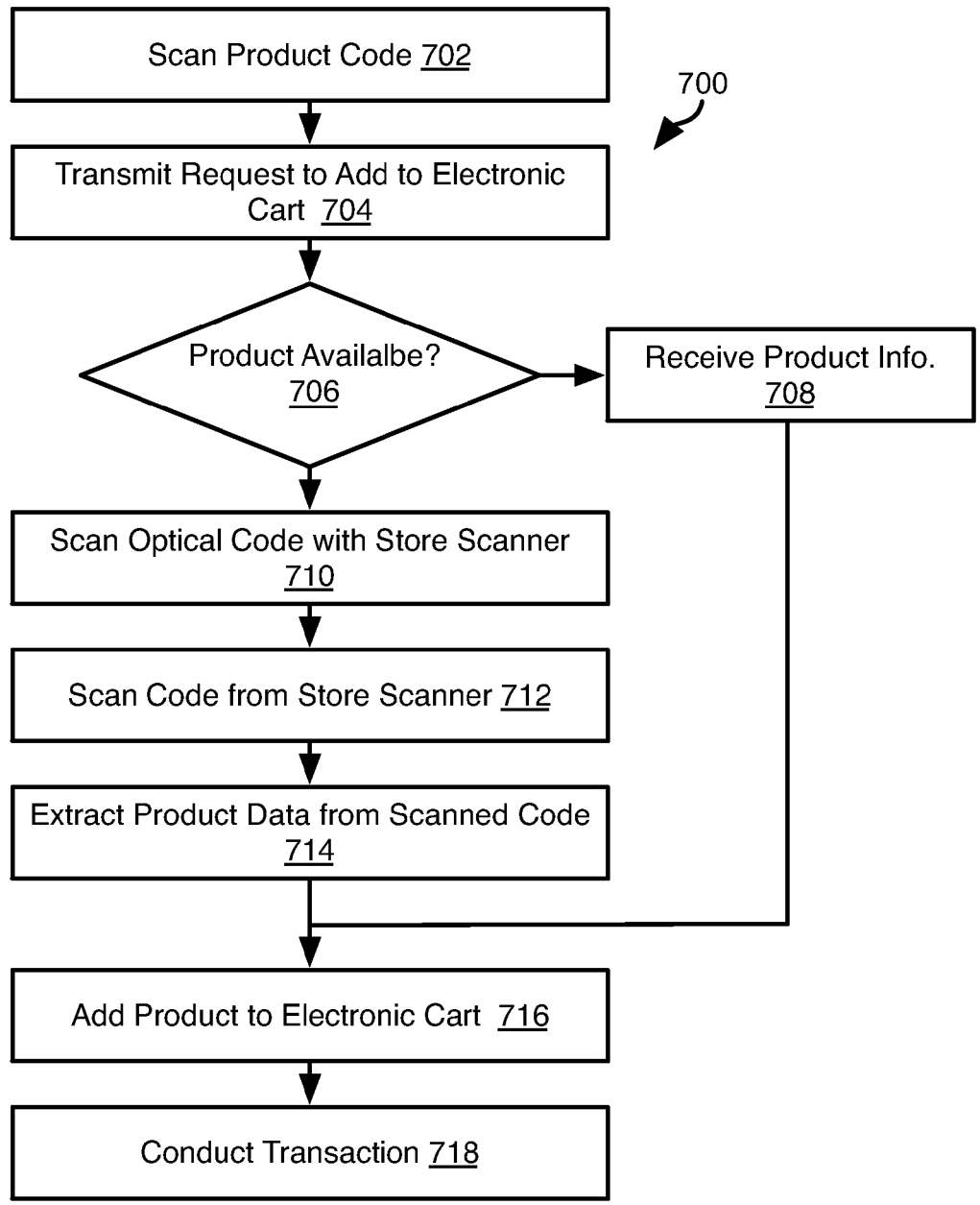
FIG. 7 is a process flow diagram of a method for adding items to an electronic shopping cart using an in-store scanner in accordance with an embodiment of the invention.

FIG. 7 illustrates a method 700 that may be executed by a user computing device 104a or completely or partially executed elsewhere with an interface provided on a user computing device 104a. The method 700 may be performed in a store having an in-store scanner 108 configured to perform the method 600.

The method 700 may include scanning 702 a product code, such as a code 304 affixed to a product, product packaging, or shelf or display where a product is stocked. A product identifier or other code is extracted from the scanned code and a request to add the product to an electronic care is transmitted 704, such as to a global server 102a. A response to the request may be received and evaluated 706. If the response is found to indicate that data for the product identifier is available on the global server, then this information may be received 708 and used as described hereinbelow.

If the response is negative, or otherwise indicates that the product identifier is unknown to the global server 102a, then the method 700 may include scanning 710 the same optical code as for the method 702 with an in-store scanner 108, such as upon instruction by the customer. As noted above with respect to the method 400, a customer may be prompted to scan a product using an in-store scanner if a global server 102a indicates that a product identifier is unknown. As described with respect to the method 600, upon scanning a code 304 for a product, the in-store scanner 108 is operable to retrieve product information and generate an optical encoding of this information. This optical code may then be scanned 712 by the user computing device 14a and the data encoded therein may be extracted 714.

Product information received 708 from a global server or extracted 714 may then be used to add 716 a product to an electronic shopping cart 716 or access some other functionality of a merchant application or a web-integrated service offered by a merchant. In some embodiments, the data structures defining the electronic shopping cart are stored on the user computing device 104a, in others the electronic shopping cart is stored in a user account hosted or accessed by the global server system 102a. A transaction in which the products in the electronic shopping cart are purchased may then be conducted 718 in coordination with the user computing device 104a, such as according to the method 800 of FIG. 8.

Figure 8:
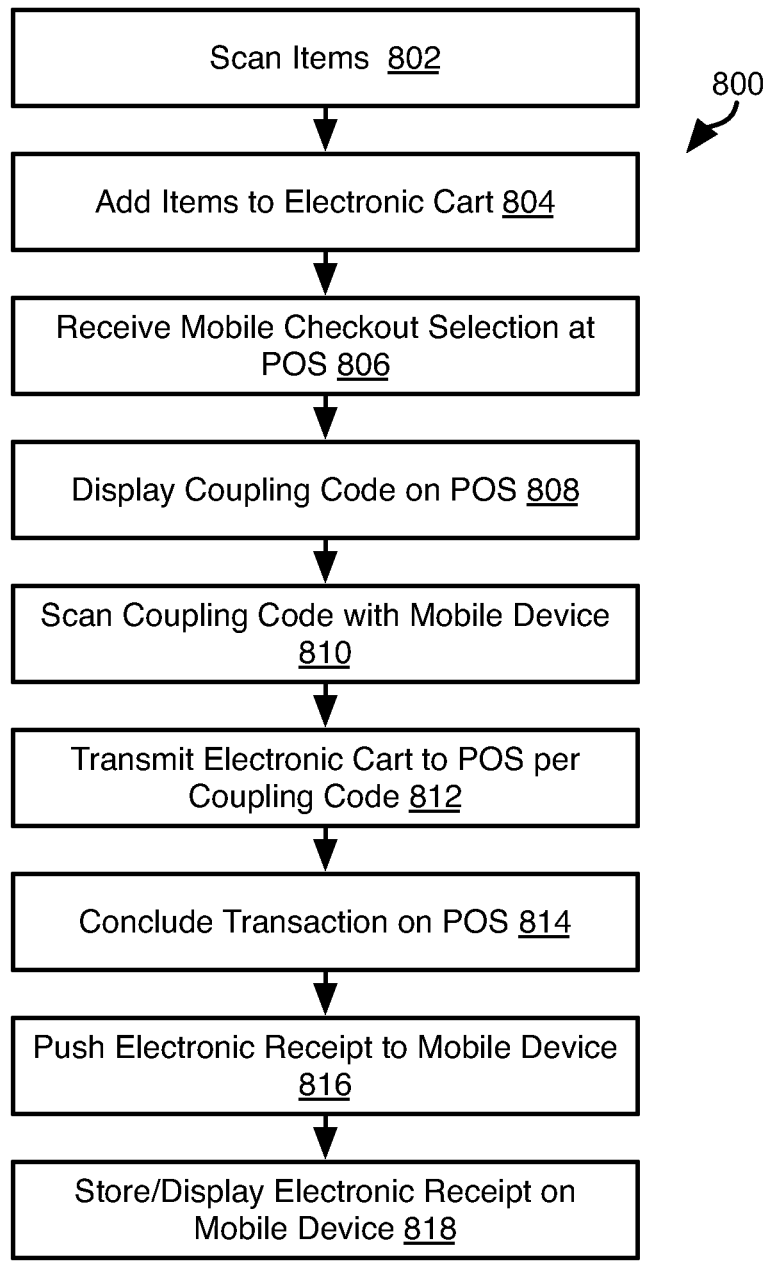
FIG. 8 is a process flow diagram of a method for processing a transaction at an in-store POS using an electronic shopping cart in accordance with an embodiment of the invention.

FIG. 8 illustrates an example method 800 for conducting an in-store transaction using an electronic shopping cart assembled according to methods described hereinabove. In conventional ecommerce transactions, an electronic shopping cart is assembled online, electronic payment is processed, and then shipping of the purchased products is authorized. In the illustrated method 800, an electronic shopping cart is populated by scanning items in a store with a user computing device 104a as described above.

In the illustrated method 800, items are scanned 802 and added 804 to an electronic shopping cart, such as according to the methods described hereinabove. At a POS 106a, a request may be received 806 to use mobile self checkout (MSCO). This may be communicated verbally to a cashier who then inputs or otherwise specifies the MSCO option to the POS 106a. In response to receipt of this instruction, the POS 106a, generates and displays a code that is used to couple a particular user computing device to that POS 106a. The displayed code may be a one-off code that is generated for each transaction or otherwise used for only one transaction.

The user computing 104a scans 810 the displayed coupling code. The user computing device then transmits 812 the contents of the electronic cart to the POS 106a using the coupling code. This coupling code may be an address that can be used to transmit the contents of the electronic shopping cart directly to the POS 106a. Alternatively, the contents of the cart with the coupling code may be transmitted with the coupling code to the global server system 102a. The global server system 102a may then interpret the coupling code to identify the POS 106a that generated the coupling code and transmit the contents of the electronic shopping cart to this POS 106a.

The contents of the electronic shopping cart received by the POS 106a may then be used to conclude 814 the transaction on the POS 106a. The items received by the POS 106a may, for example, may treated in the same manner as items input to the POS 106a by scanning bar codes in the conventional manner. Likewise, concluding 814 the transaction may include receiving tender of cash, check, or electronic payment, as for the typical in-store transaction.

In some embodiments, the POS 106a may simply invoke printing of a paper receipt after concluding 814 the transaction. In some embodiments, the POS 106a may additionally or alternatively push 816 an electronic receipt to the user computing device 104a. For example, the contents of the electronic shopping cart received by the POS 106a may be accompanied by a user identifier. This user identifier may then be used by the POS 106a to route an electronic receipt to the user computing device 104a and/or associated the electronic receipt with a user account associated with the user identifier. A user computing device 104a upon receiving the pushed electronic receipt, the user computing device may one or both of store 818 the electronic receipt and display the receipt on the user computing device 104a.

The method 800 is just one example of a use for data obtained according to methods described herein. In particular, the information obtained by scanning product information displayed in an optical code displayed by the in-store scanner 108 may be provided to an application that interacts with data or services provided by the global server system 102a in the same manner as product information retrieved from the server system 102a.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for shopping, the method comprising:
scanning, using a mobile computing device, a first optical code corresponding to a first product for which a global server system has a record;
scanning, by the mobile computing device, a second optical code corresponding to a second product;
transmitting, by the mobile computing device, data extracted from scanning the second optical code to the global server; and
displaying, on the mobile computing device, a prompt to obtain data for the second product from an in-store optical code scanner if the global server does not have a record for the second product;
scanning, using the mobile computing device, a third optical code from a display of the in-store optical code scanner; and
invoking, by the mobile computing device, addition of the first and second products to a shopping list.

2. The method of claim 1, wherein invoking addition of the first and second products to the shopping list comprises invoking addition of the first and second products to an electronic shopping cart.

3. The method of claim 1, wherein scanning the first optical code comprises scanning the first optical code as affixed to an instance of the first product.

4. The method of claim 1, further comprising:
scanning, by the mobile computing device, a fourth optical code corresponding to an in-store point of sale (POS) device; and
in response to scanning of the fourth optical code, transmitting, by the mobile computing device, the shopping list to the POS device.

5. The method of claim 4, wherein transmitting the shopping list to the POS device comprises transmitting the shopping list to the POS device by way of the global server system.

6. The method of claim 4, further comprising:
receiving, by the mobile computing device, an electronic receipt for purchase of the shopping list from the POS device.

7. The method of claim 1, further comprising:
scanning, using the in-store optical code scanner, the second optical code corresponding to the second product;
retrieving, by the in-store optical code scanner, data relating to the second product from a local server different from the global server;
encoding, with the in-store optical code scanner, the data relating to the second product into the third optical code; and
displaying, with the display of the in-store optical code scanner, the third optical code.

8. The method of claim 1, wherein the third optical code is a quick response (QR) code.

9. A system for shopping, the system comprising a mobile computing device including one or more processors and one or more memory devices operably coupled to the one or more processors, the one or more memory devices storing executable and operational data effective to cause the one or more processors to:
scan a first optical code corresponding to a first product for which a global server system has a record;
scan a second optical code corresponding to a second product;
transmit data extracted from scanning the second optical code to the global server;
display a prompt to obtain data for the second product from an in-store optical code scanner if the global server does not have a record for the second product;
scan a third optical code from a display of the in-store optical code scanner; and
invoke addition of the first and second products to a shopping list.

10. The system of claim 9, wherein the mobile computing device comprises a camera and wherein the executable and operational data are further effective to cause the one or more processors to scan the first and second and third optical codes using the camera.

11. The system of claim 9, wherein the executable and operational data are further effective to cause the one or more processors to invoke addition of the first and second products to the shopping list by invoking addition of the first and second products to an electronic shopping cart.

12. The system of claim 9, wherein the executable and operational data are further effective to cause the one or more processors to scan the first optical code by scanning the first optical code as affixed to an instance of the first product.

13. The system of claim 9, wherein the executable and operational data are further effective to
cause the one or more processors to: scan a fourth optical code corresponding to an in-store point of sale (POS) device; and
in response to scanning of the fourth optical code, transmit the shopping list to the POS device.

14. The method of claim 13, wherein transmitting the shopping list to the POS device comprises transmitting the shopping list to the POS device by way of the global server system.

15. The system of claim 13, wherein the executable and operational data are further effective to cause the one or more processors to receive an electronic receipt for purchase of the shopping list from the POS device.

16. The system of claim 9, wherein the in-store optical code scanner is further configured to:
scan the second optical code corresponding to the second product;
retrieve data relating to the second product from a local server different from the global server;
encode the data relating to the second product into the third optical code; and
display the third optical code.

17. The system of claim 9, wherein the third optical code is a quick response (QR) code.

18. The system of claim 9, wherein the in-store optical code scanner comprises a laser bar code scanner.

* * * * *